United States Patent
Teichman

(10) Patent No.: US 9,965,612 B2
(45) Date of Patent: May 8, 2018

(54) METHOD AND SYSTEM FOR VISUAL AUTHENTICATION

(71) Applicant: Lighthouse AI, Inc., Palo Alto, CA (US)

(72) Inventor: Alexander William Teichman, Palo Alto, CA (US)

(*) Notice: Subject to any disclaimer, the term of this patent is extended or adjusted under 35 U.S.C. 154(b) by 0 days. days.

(21) Appl. No.: 15/132,513

(22) Filed: Apr. 19, 2016

(65) Prior Publication Data
US 2017/0300685 A1 Oct. 19, 2017

(51) Int. Cl.
| | | |
|---|---|---|
| *G06F 21/36* | (2013.01) | |
| *G06T 7/00* | (2017.01) | |
| *H04N 5/225* | (2006.01) | |
| *G06F 21/31* | (2013.01) | |

(52) U.S. Cl.
CPC .......... *G06F 21/36* (2013.01); *G06F 21/31* (2013.01); *G06T 7/0022* (2013.01); *H04N 5/225* (2013.01); *G06T 2207/30232* (2013.01)

(58) Field of Classification Search
CPC ....... G06F 21/36; G06F 21/31; G06T 7/0022; G06T 2207/30232; G06T 7/002; H04N 5/225
See application file for complete search history.

(56) References Cited

U.S. PATENT DOCUMENTS

| | | | | |
|---|---|---|---|---|
| 6,111,502 A | * | 8/2000 | Lenglart | G08B 25/008 340/5.28 |
| 8,136,724 B1 | * | 3/2012 | Aidasani | G06Q 20/3223 235/379 |
| 8,805,029 B1 | * | 8/2014 | Yeung | G06K 9/00261 382/115 |
| 2004/0189471 A1 | * | 9/2004 | Ciarcia, Jr. | G07C 9/00111 340/572.1 |
| 2006/0198441 A1 | * | 9/2006 | Chi | G08B 13/19602 375/240.16 |
| 2009/0167862 A1 | * | 7/2009 | Jentoft | G08B 13/19641 348/143 |
| 2012/0054833 A1 | * | 3/2012 | Albisu | G06F 21/43 726/4 |
| 2012/0056722 A1 | * | 3/2012 | Kawaguchi | G06K 7/10009 340/10.1 |
| 2012/0283871 A1 | * | 11/2012 | Chai | G06F 21/32 700/237 |
| 2013/0091561 A1 | * | 4/2013 | Bruso | G06F 21/31 726/16 |
| 2013/0254858 A1 | | 9/2013 | Giardina et al. | |

(Continued)

*Primary Examiner* — Theodore C Parsons
*Assistant Examiner* — Carlos M De Jesus Lassala
(74) *Attorney, Agent, or Firm* — Chamberlain Hrdlicka

(57) ABSTRACT

A method for visual authentication with a monitoring system. The method includes pre-provisioning the monitoring system with a reference visual authentication element, obtaining an image of a user-presented visual authentication element and generating a validation result by validating the user-presented visual authentication element against the reference visual authentication element. The method further includes, based on the validation result, making a determination that the user-presented visual authentication element matches the reference visual authentication element, and taking an action affiliated with the reference visual authentication element.

14 Claims, 7 Drawing Sheets

(56) References Cited

U.S. PATENT DOCUMENTS

| | | | |
|---|---|---|---|
| 2013/0291081 A1* | 10/2013 | Mechaley, Jr. | H04W 12/06 |
| | | | 726/7 |
| 2014/0359722 A1* | 12/2014 | Schultz | H04L 63/0861 |
| | | | 726/5 |
| 2015/0341370 A1* | 11/2015 | Khan | H04L 63/20 |
| | | | 726/30 |
| 2016/0150124 A1* | 5/2016 | Panda | H04N 1/442 |
| | | | 358/1.13 |
| 2016/0189529 A1* | 6/2016 | Lee | G08B 25/008 |
| | | | 340/541 |
| 2017/0064551 A1* | 3/2017 | Block | H04W 12/06 |

* cited by examiner

METHOD AND SYSTEM FOR VISUAL AUTHENTICATION

BACKGROUND

Image-based motion detection may be used by security systems for monitoring an environment. A change of the operating mode of the security system, such as disarming the security system, may require authentication of the person attempting to change the operating mode.

SUMMARY

In general, in one aspect, the invention relates to a method for visual authentication with a monitoring system. The method includes pre-provisioning the monitoring system with a reference visual authentication element, obtaining an image of a user-presented visual authentication element and generating a validation result by validating the user-presented visual authentication element against the reference visual authentication element. The method further includes, based on the validation result, making a determination that the user-presented visual authentication element matches the reference visual authentication element, and taking an action affiliated with the reference visual authentication element.

In general, in one aspect, the invention relates to a non-transitory computer readable medium storing instructions for visual authentication with a monitoring system. The instructions enable the monitoring system to be pre-provisioned with a reference visual authentication element, obtain an image of a user-presented visual authentication element, and generate a validation result by validating the user-presented visual authentication element against the reference visual authentication element. The instructions further enable the monitoring system to, based on the validation result, make a determination that the user-presented visual authentication element matches the reference visual authentication element; and take an action affiliated with the reference visual authentication element.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a monitoring system used for securing an environment. A monitoring system may detect object movement in a monitored environment, may isolate the moving object(s) from the surrounding environment, and may classify the moving object(s). Based on the classification of the moving object(s) by a classification algorithm, the moving objects may be determined to be either threats, harmless, or unknown. Appropriate actions, such as calling the police, may subsequently be taken.

In one or more embodiments of the invention, the operating mode of the monitoring system may be controlled by a user. Operating modes may include "armed", "disarmed", and other user selectable operating modes. In one or more embodiments of the invention, a user is required to authenticate, prior to changing the operating mode of the monitoring system. A user may authenticate, for example, as the owner of the premises protected by the monitoring system, or as another person authorized to change the operating state of the monitoring system and/or as a person authorized to be present within the environment that is monitored by the monitoring system. More specifically, one or more embodiments of the invention enable a monitoring system to visually authenticate a person. The visual authentication may be performed using a visual authentication element, presented to the monitoring system by an authenticating user, as further described with reference to FIGS. 2-6.

Figure 1:
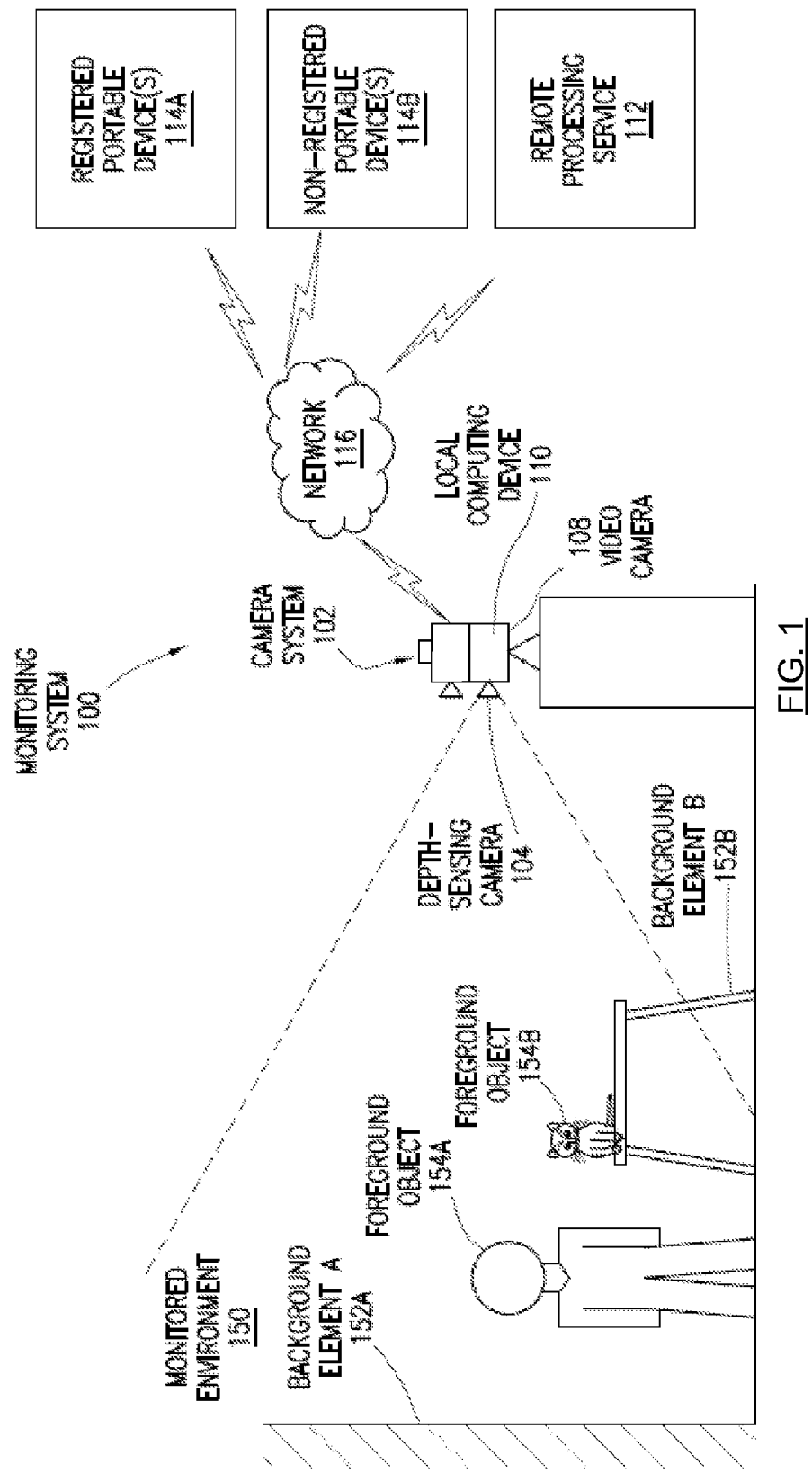
FIGS. 1 and 2 show systems in accordance with one or more embodiments of the invention.

FIG. 1 shows a monitoring system (100) used for the surveillance of an environment (monitored environment (150)), in accordance with one or more embodiments of the invention. The monitored environment may be a three-dimensional space that is within the field of view of a camera system (102). The monitored environment (150) may be, for example, an indoor environment, such as a living room or an office, or it may be an outdoor environment such as a backyard. The monitored environment (150) may include background elements (e.g., 152A, 152B) and foreground objects (e.g., 154A, 154B). Background elements may be actual backgrounds, i.e., a wall or walls of a room. In one embodiment of the invention, the monitoring system (100) may further classify other objects, e.g., stationary objects such as a table (background element B (152B)) as background elements. In one embodiment of the invention, the monitoring system (100) may classify other objects, e.g., moving objects such as a human or a pet, as foreground objects (154A, 154B). The monitoring system (100) may further classify detected foreground objects (154A, 154B) as threats, for example, if the monitoring system (100) determines that a person (154A) detected in the monitored environment (150) is an intruder, or as harmless, for example, if the monitoring system (100) determines that the person (154A) detected in the monitored environment (150) is the owner of the monitored premises, or if the classified object is a pet (154B). In one embodiment of the invention, the monitoring system (100) includes a camera system (102) and a remote computing device (112). In one embodiment of the invention, the monitoring system further includes one or more portable devices (114A, 114B). Each of these components is described below.

In one or more embodiments of the invention, the monitoring system (100) includes a camera system (102). The camera system may include a depth sensing camera (104) and a local computing device (110), and may further include a video camera (108). The camera system (102) may be a portable unit that may be positioned such that the field of view of the depth-sensing camera (104) covers an area of interest in the environment to be monitored. The camera system (102) may be placed, for example, on a shelf in a corner of a room to be monitored, thereby enabling the camera to monitor the space between the camera system (102) and a back wall of the room. Other locations of the camera system may be used without departing from the invention.

In one embodiment of the invention, the depth-sensing camera (104) is a camera capable of reporting multiple depth values from the monitored environment (150). For example, the depth-sensing camera (104) may provide depth measurements for a set of 320×240 pixels (Quarter Video Graphics Array (QVGA) resolution) at a temporal resolution of 30 frames per second (fps). The depth-sensing camera (104) may be based on scanner-based or scanner-less depth measurement techniques such as, for example, LIDAR, using time-of-flight measurements to determine a distance to an object in the field of view of the depth-sensing camera (104). In one embodiment of the invention, the depth-sensing camera (104) may further provide a 2D grayscale image, in addition to the depth-measurements, thereby providing a complete 3D grayscale description of the monitored environment (150). Those skilled in the art will appreciate that the invention is not limited to the aforementioned depth-sensing technology, temporal, and/or spatial resolutions. For example, stereo cameras may be used rather than time-of-flight-based cameras. Those skilled in the art will further recognize that a monitoring system may not use any depth sensing technology, without departing from the invention. The monitoring system may, for example, use one or more color or grayscale video cameras rather than a depth-sensing camera.

Continuing with the discussion of FIG. 1, the video camera (108) may be capable of continuously capturing a two-dimensional video of the environment (150). The video camera may be rigidly connected to the other components of the camera system (102). The field of view and the orientation of the video camera may be selected to cover a portion of the monitored environment (150) similar (or substantially similar) to the portion of the monitored environment captured by the depth sensing camera. The video camera may use, for example, an RGB or CMYG color CCD or CMOS sensor with a spatial resolution of for example, 320×240 pixels, and a temporal resolution of 30 frames per second (fps). Those skilled in the art will appreciate that the invention is not limited to the aforementioned image sensor technologies, temporal, and/or spatial resolutions.

In one embodiment of the invention, the camera system (102) includes a local computing device (110). Any combination of mobile, desktop, server, embedded, or other types of hardware may be used to implement the local computing device. For example, the local computing device (110) may be a system on a chip (SOC), i.e. an integrated circuit (IC) that integrates all components of the local computing device (110) into a single chip. The SOC may include one or more processor cores, associated memory (e.g., random access memory (RAM), cache memory, flash memory, etc.), a network interface (e.g., a local area network (LAN), a wide area network (WAN) such as the Internet, mobile network, or any other type of network) via a network interface connection (not shown), and interfaces to storage devices, input and output devices, etc. The local computing device (110) may further include one or more storage device(s) (e.g., a hard disk, an optical drive such as a compact disk (CD) drive or digital versatile disk (DVD) drive, a flash memory stick, etc.), and numerous other elements and functionalities. In one embodiment of the invention, the computing device includes an operating system (e.g., Linux) that may include functionality to execute one of more steps of the methods further described below. Those skilled in the art will appreciate that the invention is not limited to the aforementioned configuration of the local computing device (110). In one embodiment of the invention, the local computing device (110) may be integrated with the depth sensing camera (104), and/or the video camera (108). Alternatively, the local computing device (110) may be detached from the depth sensing camera (104) and/or the video camera (108), and may be using wired and/or wireless connections to interface with the local computing device (110). In one embodiment of the invention, the local computing device (110) executes methods that include functionality to implement at least portions of the various methods described below (see e.g., FIGS. 3-6). The methods performed by the local computing device (110) may include, but are not limited to, functionality for sending depth data and/or video data to the remote processing service (112), validating user-provided visual authentication elements, triggering actions affiliated with successful and/or failed validation attempts and/or communicating the validation result to the remote processing service (112).

Continuing with the discussion of FIG. 1, in one or more embodiments of the invention, the monitoring system (100) includes a remote processing service (112). In one embodiment of the invention, the remote processing service (112) is any combination of hardware and software that includes functionality to serve one or more camera systems (102). More specifically, the remote processing service (112) may include one or more servers (each including at least a processor, memory, persistent storage, and a communication interface) executing one or more applications (not shown) that include functionality to implement various methods described below with reference to FIGS. 3-6). The services provided by the remote processing service (112) may include, but are not limited to, functionality to: receive and archive streamed video, identify and track foreground objects (154) from the depth data provided by a camera system (102), and classify identified foreground objects (154). In one embodiment of the invention, the services provided by the remote processing service includes functionality for validating user-provided visual authentication elements and taking actions affiliated with successful and/or failed validation attempts.

In one or more embodiment of the invention, the monitoring system (100) includes one or more portable devices (114A, 114B). A portable device (114A, 114B) may be a device (e.g., a laptop, smartphone, tablet, etc.) capable of receiving notifications from the remote processing service (112). A notification may be, for example, a text message, a phone call, a push notification, etc. In one embodiment of the invention, the portable device further includes functionality to enable a user of the portable device (114A) to interact with the camera system (102) and/or the remote processing service (112). The user may, for example, receive video streams from the camera system, configure, activate or deactivate the camera system, etc. In one embodiment of the invention, two categories of portable devices exist. The functionalities enabling a user to interact with other components of the monitoring system may only be available on registered portable devices (114A).

Registered portable devices (114A) have been registered with the monitoring system (100). Registration may include affiliating a portable device with the monitoring system, for example, by installing an application on the portable device, with which the owner of the portable device can authenticate with the system. Alternatively or in addition, registration may include registering a hardware ID of the portable device, e.g., a media access control address, with the system. The registration may be performed by a system administrator of the monitoring system. Registered portable devices (114A) include, for example, smartphones equipped with a smartphone app that allows a user to log on to the monitoring system (100) thereby providing a configurable degree of control over the monitoring system. For example, the home owner may have control over the entire system, including access to administrative functions that allow reconfiguration of the monitoring system. Other family members may have only limited control over the monitoring system. Family member may, for example, be able to use the smartphone to arm and disarm the system, but the may not be able to entirely disable the system or to access administrative functions. Portable devices may be carried, for example, by the owner and/or administrator of the monitoring system, by family members or other people that regularly access the premises secured by the monitoring system.

In one embodiment of the invention, non-registered portable devices (114B) are also used in conjunction with the monitoring system. Non-registered portable devices include portable devices that may be contacted by the monitoring system but that are otherwise not necessarily affiliated with the monitoring system. The monitoring system may, for example, contact a smartphone to transmit a message, e.g., using an email address to send a message using an email protocol, or using a telephone number to send a message using the multimedia messaging service (MMS) protocol to the user of the non-registered portable device. Those skilled in the art will recognize that other protocols may be used to transmit messages from the monitoring system to a non-registered portable device. In one embodiment of the invention, the interaction between a non-registered portable device (114B) and the monitoring system is limited. For example, no application for accessing the monitoring system may be available on the non-registered device, and a user of a non-registered portable device may therefore not be able to directly access functionalities of the monitoring system. In one embodiment of the invention, the role of non-registered portable devices is limited to receiving messages from the monitoring system and to displaying the content of the received messages. The message content may include images, symbols, etc. The use of non-registered portable devices is further discussed below.

The components of the monitoring system (100), i.e., the camera system(s) (102), the remote processing service (112) and the portable device(s) (114A, 114B) may communicate using any combination of wired and/or wireless communication protocols. In one embodiment of the invention, the camera system(s) (102), the remote processing service (112) and the portable device(s) (114A, 114B) communicate via a wide area network (e.g., over the Internet), and/or a local area network (e.g., an enterprise or home network). The communication between the components of the monitoring system (100) may include any combination of secured (e.g., encrypted) and non-secure (e.g., un-encrypted) communication. The manner in which the components of the monitoring system (100) communicate may vary depending on the implementation of the invention.

One skilled in the art will recognize that the monitoring system is not limited to the components shown in FIG. 1. For example, the depth-sensing camera may be based on different underlying depth-sensing technologies. Alternatively, the monitoring system may not use any depth-sensing technology and may instead perform threat detection based on two-dimensional video images. Further, the camera system may include additional components not shown in FIG. 1, e.g. infrared illuminators providing night vision capability, ambient light sensors that may be used by the camera system to detect and accommodate changing lighting situations, etc. Further, a monitoring system may include any number of camera systems, any number of remote processing services, and/or any number of portable devices. In addition, the monitoring system may be used to monitor a variety of environments, including various indoor and outdoor scenarios.

Figure 2:
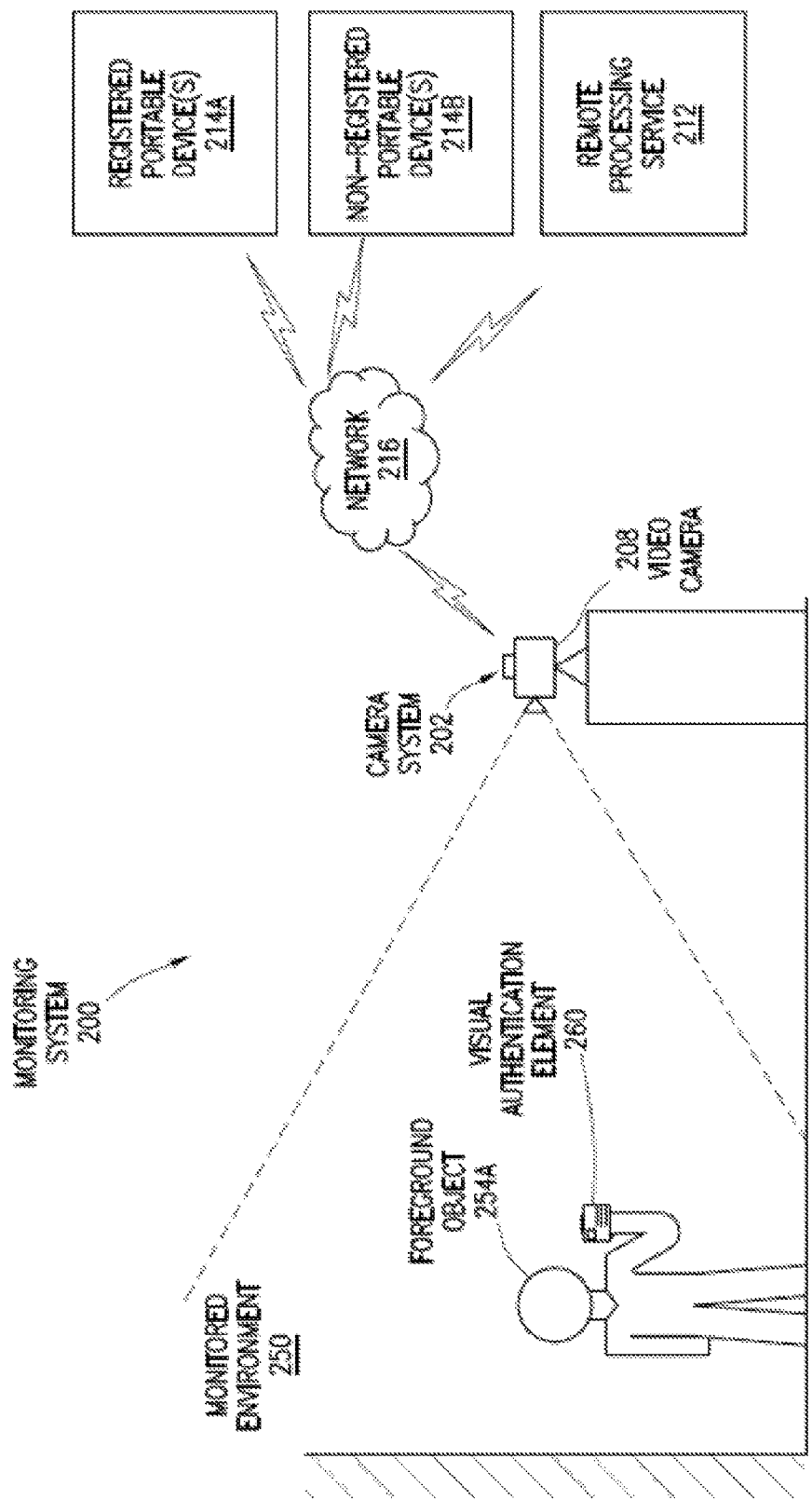

Turning to FIG. 2, a monitoring system in accordance with an embodiment of the invention is shown as an authentication is being performed. The monitoring system (200) includes a camera system (202) that may include a video camera (208). A person (foreground object (254)) is present in the monitored environment (250). The person presents a visual authentication element (260) in a manner such that the visual authentication element (260) may be captured by the video camera (208). The monitoring system, in accordance with an embodiment of the invention, validates the presented visual authentication element and, depending on whether the validation was successful, takes an action, as discussed below with reference to FIG. 5.

In one embodiment of the invention, the visual authentication element (260) is a visually recognizable physical object. The object may be, for example, a credit card, an identification card or a membership card. Frequently, the physical object is an object that a user may conveniently carry, e.g., in a wallet. Such a physical object may originally serve a purpose not related to visual authentication. Consider, for example, the use of a credit card as a visual authentication element. The original purpose of the credit card is making payments. However, the secondary purpose of the credit card may become that of a visual authentication element. To serve as a visual authentication element (260), a physical object, in accordance with an embodiment of the invention, prior to its use as a visual authentication element, needs to be registered with the monitoring system (200) as described below with reference to FIG. 3. After registration, the physical object may be recognized by the monitoring system as a valid visual authentication element.

In one embodiment of the invention, multiple visual authentication elements (260) may be required for a visual authentication. For example, multiple different physical objects may be required to be presented to complete an authentication. The order in which these multiple objects are presented to the monitoring system may or may not matter, depending on how embodiments of the invention are implemented.

In one embodiment of the invention, a visual authentication requires a particular movement of a physical object. For example, a gesture, performed by a user, may be required for authentication.

In one embodiment of the invention, multiple users may be equipped with visual authentication elements. Multiple users may use a set of identical authentication elements (e.g., in a scenario in which a set of identical ID cards is distributed to the users). In this case, the monitoring system may not be able to distinguish these users. Alternatively, in accordance with another embodiment of the invention, different (i.e., unique) visual authentication elements may be assigned to different users. In this case, the monitoring system may be able to distinguish users, based on the visual authentication elements that are presented.

In an alternative embodiment of the invention, the visual authentication element (260) is visual content, displayed on a non-registered portable device (214B), e.g., on a smartphone display. The visual content may be, for example, an image or a pattern. Any kind of visually recognizable and distinguishable image or pattern may be used as a visual authentication element. The image may be selected from, for example, a photo album or any other type of image library of the portable device, the monitoring system, or any other system. The image or pattern, in accordance with an embodiment of the invention, prior to its use, is sent to the non-registered portable device to be available for display, when performing the visual authentication. The non-registered device may be, for example, the smartphone of a guest to be temporarily allowed in the house. An image, e.g. a randomly selected image, may be sent to the guest, prior to his visit to the house. For example, an image, registered with the monitoring system (200) may be sent to the guest to grant temporary access to the house. The image may be sent to the guest, for example, via an email or via a multimedia messaging service (MMS) message. The guest may enter the house and present the received image to the monitoring system to authenticate with the system. Upon successful authentication, the monitoring system may disarm. The disarming may be time limited, e.g., for a few hours only, and/or it may only disarm the monitoring system at a particular date and/or time. Also, a visual authentication element may expire after a certain number of uses. Further, the monitoring system, although disarmed, may keep recording activities within the monitored environment. Further, in multi-zone monitoring systems, only specific zones may be disarmed, whereas other zones that the guest is not authorized may remain armed. The details regarding electing or generating the visual content, registering the visual content as a visual authentication element, and using the registered visual content as a visual authentication element are discussed below with reference to FIGS. 3-6.

One skilled in the art will recognize that the monitoring system is not limited to the components shown in FIG. 2. For example, objects to be used for visual authentication are not limited to cards carried in a wallet. Any visually perceivable object that a user may be able to present to the monitoring system for the purpose of visual authentication may be used. This includes objects for which the visual authentication is a non-primary purpose but also objects for which the visual authentication is the primary or only purpose. Further, the physical object may be the user, or body parts of the user itself. For example, the face of the user, a particular facial expression or a particular posture may be used as a visual authentication element. Further, any combination of physical objects, the user himself, movements of a physical object and/or a user may serve as visual authentication element. In addition, a user may carry multiple objects that are registered as visual authentication elements. These objects may have been configured to trigger different actions. In one embodiment of the invention, a user of the monitoring system has two cards (or other objects that are registered with the monitoring system). The monitoring system is programmed to disarm, upon presentation of the first card. The first card may thus be used under normal circumstances as a "disarming card". The monitoring system is programmed to activate a silent alarm, while only seemingly disarming, upon presentation of the second card. The second card may thus be used if a threat is present (e.g., a burglar forcing the user to disarm the system) as a "panic card".

FIGS. 3-6 show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-6 may be performed in parallel with any other steps shown in FIGS. 3-6 without departing from the invention.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform methods, described in FIGS. 3-6.

The execution of the methods may be distributed between the local computing device of the camera system and the remote processing service. For example, some of the steps described below may be executed by the remote processing service, by the local computing device or by the portable device, or by a combination of these devices.

Figure 3:
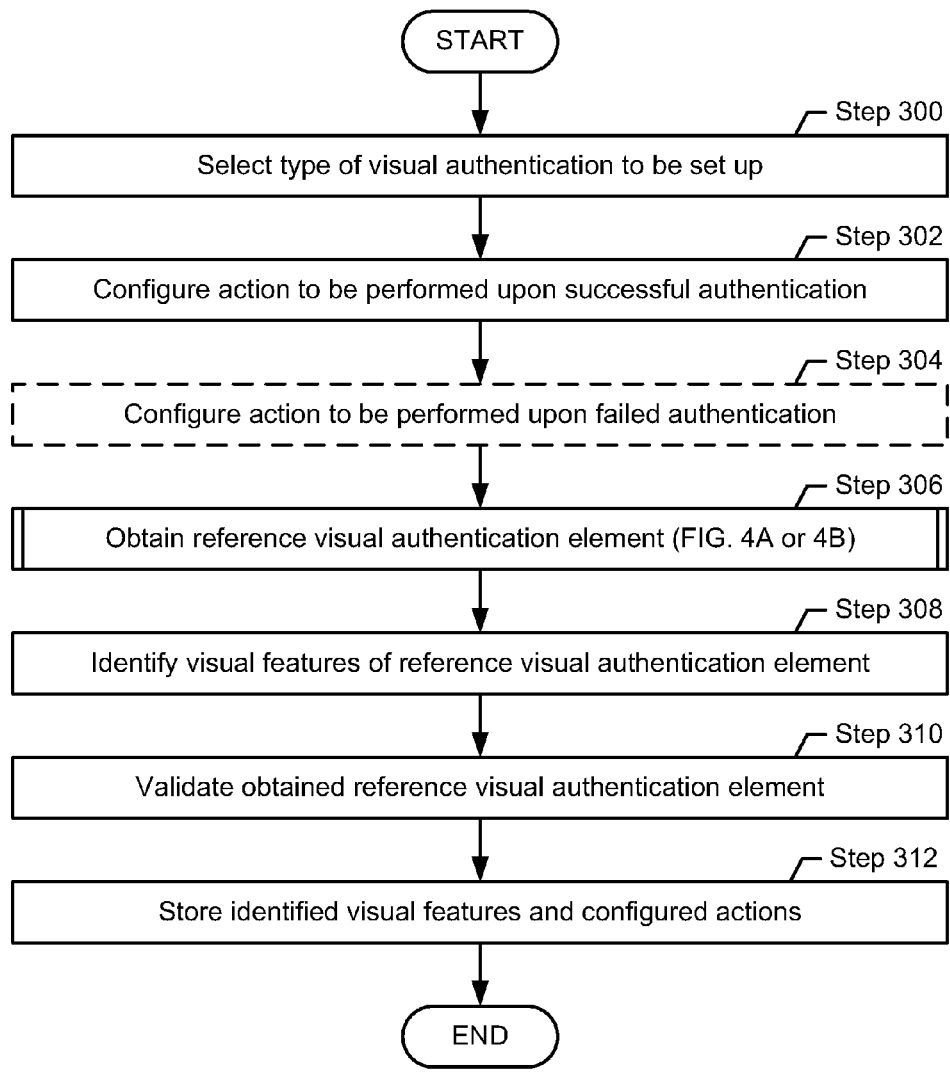
FIGS. 3-6 show flowcharts in accordance with one or more embodiments of the invention.

FIG. 3 shows a method for registering a new visual authentication element to be used for visual authentication as described with reference to FIGS. 5 and 6. The method described in FIG. 3 may be executed by a monitoring system administrator with privileges that enable the administrator to select individuals to be authorized to use the method for visual authentication as described below with reference to FIGS. 5 and 6.

The steps described in FIG. 3 may be performed to set up permanently or temporarily valid visual authentication elements. To perform the method of FIG. 3, an administrator may access an administration interface provided, for example, as part of a smartphone app installed on a registered portable device. The registered portable device may communicate directly with the camera system (e.g., using WiFi or Bluetooth communication protocols), or indirectly via the remote processing service. Alternatively, any other administration interface, provided by the monitoring system, may be used.

One or more of the steps described in FIG. 3 may be performed immediately after obtaining the reference visual authentication element. Alternatively, the execution of these steps may be deferred until later. For example, Steps 308-312 may be deferred until a visual authentication element is validated, as described in FIG. 5.

In Step 300, the administrator selects a type of visual authentication to be set up. The type of visual authentication may depend on the visual authentication element to be used for performing the authentication. As previously discussed, the visual authentication element may be either a physical object or an image. Accordingly, in Step 300, the administrator may select between a visual authentication performed by presentation of either a physical object or an image.

In Step 302, an action, to be performed upon successful authentication, is selected. Such an action may include, for example, disarming the monitoring system, disarming the monitoring system while keeping a video recording function of the monitoring system enabled, unlocking a door, triggering a silent alarm while seemingly disarming the monitoring system, etc. Those skilled in the art will recognize that a monitoring system may be freely programmable to perform any type of action upon successful authentication. Accordingly, any type of action may be programmed in Step 302.

In Step 304, an action to be performed upon failed authentication may be specified. This action may be performed whenever an authentication fails, as described below with reference to FIG. 5. This action may include, for example, the repetition of the authentication for a specified number of times, and/or the triggering of an alarm if the authentication has repeatedly failed. The action to be performed upon failed authentication may be a default action that may only need to be set up once.

In Step 306, the reference visual authentication element is obtained by the monitoring system. The reference visual authentication element is intended to serve as a reference against which image content, captured during authentication attempts, as described in FIGS. 5 and 6, is compared to determine whether the user-presented visual authentication element in the image is correct. Depending on whether the visual authentication element is a physical object or an image, either the steps described in FIG. 4A (physical object) or 4B (image) are performed.

In Step 308, visual features of the image of the reference authentication element are identified. The visual feature identification may be performed to uniquely characterize the reference authentication element in a format that enables comparison of a user-presented authentication element at the time when an authentication is performed, as described in FIG. 5, with the reference authentication element.

In one embodiment of the invention, visual features are visually salient elements of the reference visual authentication element such as, for example, edges and/or corners in the image content of the reference authentication element obtained in Step 306. Other visually distinctive features may be relied upon, in addition to or as an alternative to edges and corners, without departing from the invention. Image processing algorithms may be used to detect these visual features. Feature detection based on corners may rely on, for example, the Scale-Invariant Feature Transform (SIFT) algorithm or on the Binary Robust Invariant Scalable Keypoints (BRISK) algorithm. Other algorithms that may be relied upon include the Speeded Up Robust Features (SURF) algorithm, the Features from Accelerated Segment Test (FAST) algorithm, the Binary Robust Independent Elementary Features (BRIEF) algorithm, the Oriented FAST and Rotated BRIEF (ORB), the Local Energy based Shape Histogram algorithm, the Gradient Location and orientation Histogram (GLOH) algorithm, the Harris corner detector algorithm, the Harris-Laplace detector algorithm, the Multi-Scale Oriented Patches (MOPs) algorithm, deep learning algorithms including convolutional neural networks (CNNs), etc. These algorithms may locate visual features and may generate keypoints for the detected features. For each identified keypoint, a location may be obtained. The location may be reported in a format that is scale and rotation invariant. In one embodiment of the invention, a descriptor is generated for each keypoint. The descriptor may characterize the keypoint, for example, by describing intensity/brightness, color and/or contrast gradients in one or more directions, in the vicinity of the keypoint. The descriptor may be a vector of numbers, thus enabling direct comparison with other descriptors using, for example the Euclidian distance between the descriptors. Descriptors may alternatively or additionally include other keypoint characteristics, including, for example, various other quantifiable properties such as keypoint size, orientation, color, etc., without departing from the invention.

In embodiments of the invention that require the presentation of multiple visual authentication elements, above described identification of visual features may be repeated for each of the reference visual authentication elements.

Further, in embodiments of the invention that involve movement of a physical object, such as, for example, a gesture performed by an authenticating user, Step 306 may include a feature extraction from a series of images, captured as the gesture was performed. The feature extraction may be performed using various methods including, but not limited to, body part models, articulated iterative closest point algorithms, ray casting models, convex optimization based on model and scene constraints, etc. Based on the extracted features, the gesture may ultimately be represented by a model such as, for example, a Hidden Markov Model, a randomized decision tree or forest, etc.

In an alternative embodiment of the invention, the reference visual authentication element is treated as a template. In this case, an identification of visual features may be unnecessary. The reference visual authentication element, in Step 308, may be isolated, e.g., background may be removed, and/or image processing may be performed in order to, for example, adjust brightness, contrast and/or colors and resolution. Subsequently, the template may be directly used to perform template matching, as described with reference to FIG. 6. Further, in addition to the template isolation, an optical character recognition (OCR) operation may be performed in order to identify text content that may be included in the reference visual authentication element, e.g. if the visual authentication element is a credit card.

In Step 310, the reference visual authentication element is validated. Validation may include an assessment of image quality, including resolution, sharpness, brightness, contrast, etc. Further the validation may include an assessment of the visual features in the image. If the image quality is poor and/or the number of visual features is insufficient, the administrator may be asked to either repeat the previous steps either with the same or with a different reference visual authentication element. The user may further receive feedback regarding necessary or recommended improvements. For example, the user may be asked to turn on the light, if the image is too dark.

In Step 312, the visual features or the template of the reference visual authentication element, identified in Step 308, are stored. If text content was identified in an OCR operation, the text content may be stored as well. Further, the actions, configured in Step 302 and/or Step 304 may be stored along with the identified visual features of the reference visual authentication element. The identified visual features and/or the actions may be stored in a non-volatile storage of the local computing device and/or the remote processing service.

Figure 4A:
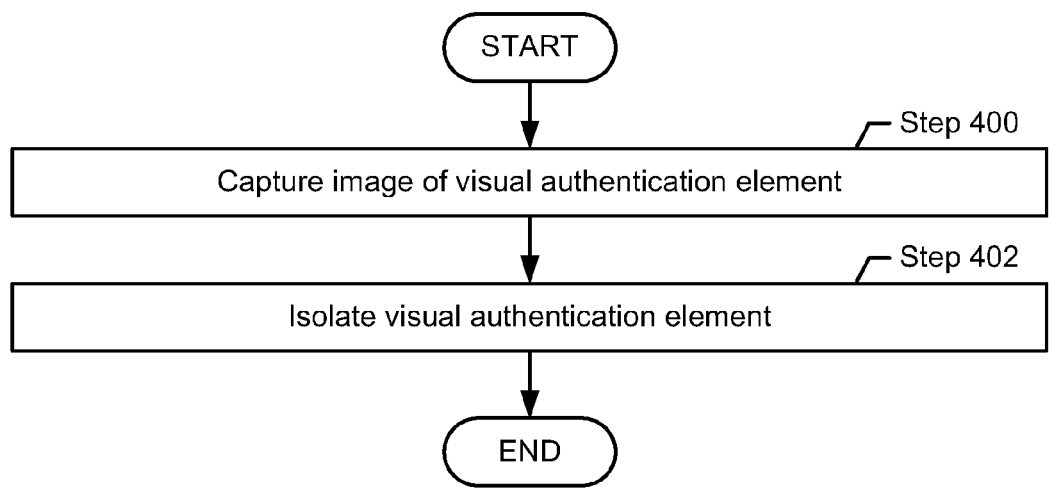
Figure 4B:
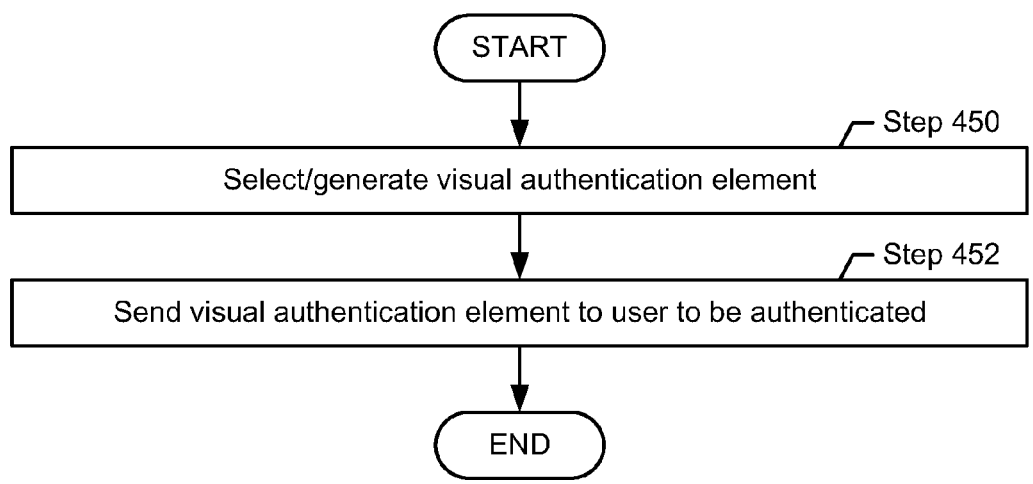

FIGS. 4A and 4B show methods for obtaining a reference visual authentication element. FIG. 4A describes how a reference visual authentication element may be obtained for a physical object, thereby enabling use of the physical object for visual authentication. FIG. 4B describes how a reference visual authentication element may be obtained by selecting or generating an image, thereby enabling use of the image, displayed on a portable device, for visual authentication.

Turning to FIG. 4A, in Step 400, an image of the visual authentication element is captured. The visual authentication element may be an object, e.g., a credit card, a driver license, or membership card, or any other type of object that a user may carry and present for authentication. The image of the object may be taken, for example, by the video camera of the monitoring system or, alternatively, by a camera of the portable device that the administrator or an authorized user may be using to register the visual authentication element. Depending on what aspect of the object is to be used for visual authentication, the object may be oriented accordingly. For example, if the front side of a credit card is to be used for authentication, an image of the front side of the credit card may be taken. If, alternatively, the back side of the credit card is to be used for authentication, an image of the back side of the credit card may be taken.

In Step 402, the visual authentication element may be isolated in the image, captured in Step 400. Image content that is not related to the visual authentication element may be removed in order to avoid the identification of visual features that are not part of the reference authentication element, e.g., of background image content. The identification and isolation may be performed manually by the administrator, for example, using an image cropping tool, or it may be performed automatically or semi-automatically by the monitoring system. The image of the isolated visual authentication element, in accordance with an embodiment of the invention, is the reference visual authentication element.

In embodiments of the invention that require the presentation of multiple visual authentication elements, above described Steps 400 and 402 are repeated for each of the visual authentication elements.

Further, in embodiments of the invention that involve movement of a physical object, such as, for example, a gesture performed by an authenticating user, Steps 400 and 402 may be performed for multiple frames of a series of frames used to capture the gesture.

Turning to FIG. 4B, in Step 450, an image is selected or generated to be the visual authentication element. The visual authentication element may be an image selected from, for example, a photo album or any other type of image library of the portable device, the monitoring system, or any other system. The image to be used as a visual authentication element may be randomly or non-randomly selected by either the monitoring system itself or by the administrator or user configuring the authentication via the image. Alternatively a visual pattern generator may produce, for example, a geometric pattern to be used as the visual authentication element. The selected or generated image, in accordance with an embodiment of the invention, is the reference visual authentication element.

In Step 452, the visual authentication element, selected or generated in Step 450, is provided to the user that is supposed to use the visual authentication element in a visual authentication. The visual authentication element may be sent, for example, in an email message or in a Multimedia Messaging Service (MMS) message. The message may, in addition, include instructions for how to properly authenticate with the visual authentication element by displaying the visual authentication element on the screen of a portable device and by presenting the displayed image to the monitoring system. The instructions may indicate, for example, a position and/or orientation of the portable device relative to the camera system during the visual authentication. In various embodiments of the invention, the instructions may also include information such as: (i) gestures associated with the visual authentication element; and/or (ii) a sequence of visual authentication elements. The instructions may further provide information regarding validity and other limitations associated with the visual authentication element. For example, the instructions may specify that the visual authentication is for one-time use at a particular time, and further that it only disarms certain zones of a multi-zone monitoring system.

Figure 5:
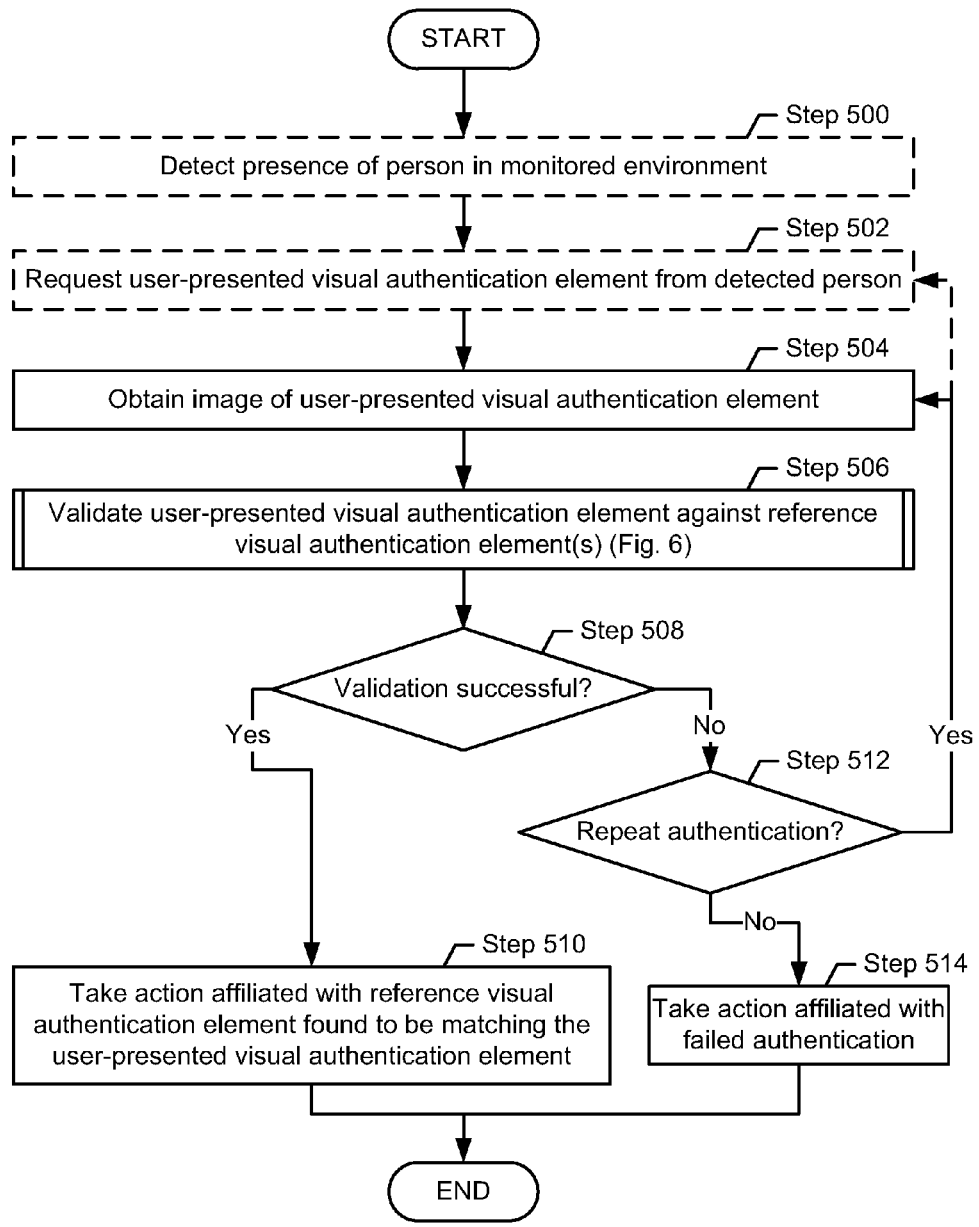

FIG. 5 shows a method for performing a visual authentication, using a visual authentication element obtained as previously described with reference to FIGS. 3-4B. The visual authentication element presented for the authentication may be either a physical object or an image.

Turning to FIG. 5, in Step 500, the presence of a person is detected in the monitored environment. In one embodiment of the invention, the detection is performed when the monitoring system is armed. A visual authentication may also be performed when the monitoring system is not armed. In such a case, the person attempting to perform the authorization may notify the monitoring system using, for example, a voice command or any other type of command to indicate the desire to perform the authentication.

In Step 502, the monitoring system requests the user to present the visual authentication element. The request may be a voice command, e.g., the phrase "identify yourself", a light signal, or any other indication that the system is awaiting authentication. Alternatively, the system may await authentication without indicating that an authentication is expected.

In Step 504, an image of the user-presented visual authentication element is obtained. The image may be obtained using the camera of the monitoring system. The camera of the monitoring system may capture a single frame or a series of frames that may be analyzed for the presence of the visual authentication element, as described below. To obtain the image, the person attempting to get authorized by the monitoring system presents the visual authentication element in a manner such that the relevant features of the visual authentication element are visible to the camera of the monitoring system. If the visual authentication element is a physical object, the physical object may be presented to the camera. If, for example, the front face of a credit card was selected as the visual authentication element, the credit card is to be oriented such that the front face of the credit card is visible to the camera. If the visual authentication element is an image to be displayed on a portable device, the person attempting to get authorized may open the image on the portable device and show the image, displayed by the portable device, to the camera of the monitoring system.

In Step 506, the user-presented visual authentication element is validated against the reference visual authentication element, previously obtained as described with reference to FIG. 3. The details of Step 506 are described in FIG. 6.

In Step 508, a determination is made about whether the validation of the user-presented visual authentication element was successful. The validation may have been successful if the method of Step 506 reports a match between the user-presented visual authorization element and one of the reference visual authorization elements that have been configured, as described in FIG. 3. If the validation was successful, the method may proceed to Step 510. If the validation was unsuccessful, the method may proceed to Step 512.

In Step 510, an action that is affiliated with the reference visual authentication element found to be matching the user-presented visual authentication is taken. As previously discussed, the action may include disarming the monitoring system, arming the monitoring system, or any other action that has been affiliated with the reference visual authentication element. Further, if the visual authentication element used for the authentication was an image presented using the screen of a portable device, the visual authentication element may be voided. Voiding the visual authentication element ensures that the visual authentication element can only be used for a one-time guest authentication.

Returning to Step 508, if a determination is made that the validation was unsuccessful, the method may proceed to Step 512. In Step 512, a determination is made about whether the authentication is to be repeated. The authentication may be repeated, for example, if the monitoring system is configured to perform repeated authentication attempts, in case an authentication has failed. For example, the monitoring system may be configured to perform up to three authentication attempts. If a determination is made that the authentication is to be repeated, the method may return to Step 504. Alternatively, the method may be configured to return to 502. If a determination is made that the authentication is not to be repeated, e.g., after multiple failed authentication attempts, the method may proceed to Step 514.

In Step 514, an action, affiliated with a failed authentication, may be taken. The action may include, for example, alerting the owner of the premises, triggering an alarm or a silent alarm. Depending on the reason for the failed authentication, different actions may be taken. For example, the actions taken when the authentication fails due to insufficient image quality may be different from the actions taken when the authentication fails as a result of an incorrect visual authentication element or no visual authentication element at all having been presented.

Figure 6:
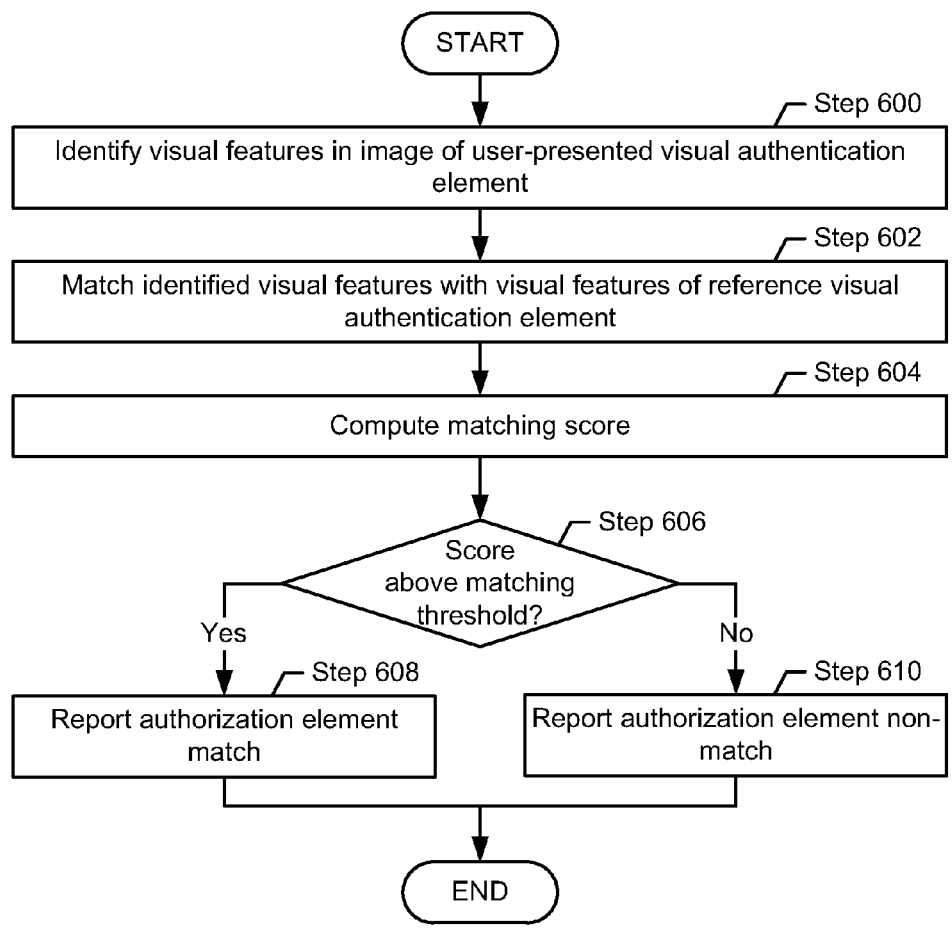

FIG. 6 shows a method for validating a user-presented visual authentication element against reference visual authentication elements. If multiple visual authorization elements were registered, as previously described with reference to FIG. 3, the steps of FIG. 6 may be repeated for each registered visual authorization element, or until the reference visual authentication element is identified.

Turning to FIG. 6, in Step 600, visual features are identified in the image of the user-presented visual authentication element. Algorithms similar to the algorithms used in Step 308 may be used for the identification. As previously described, a keypoint identification may be performed based on corner or edge detection, and/or based on other salient features in the image. For each identified keypoint, a location and a descriptor may be obtained. If necessary, image processing may be used prior to the keypoint identification in order to adjust brightness, color, contrast, etc., thereby improving and/or facilitating the keypoint identification. If the reference visual authentication element was stored as a template, Step 600 may be skipped.

In Step 602, a matching between the visual features identified in the image of the user-presented visual authentication element and the visual features of the reference visual authentication element is performed. The matching attempts to identify those visual features that exist in both the image of the user-presented visual authentication element and the reference visual authentication element. As previously noted, the algorithm(s) chosen for feature identification may be scale and/or rotation invariant, and a matching of visual features may therefore be performed successfully if there are scaling or orientation discrepancies between the reference and user-presented images. These discrepancies may arise, for example, when the user-presented visual authentication element is not properly oriented, or when the distance to the camera is different.

Alternatively, if the reference visual authentication element was stored as a template, template matching may be performed in Step 602. The template matching may be used to verify whether a copy of the template exists in the image of the user-presented visual authentication element. The template matching may be performed, for example, using a convolution operation to locate an image region in the image of the user-presented visual authentication element where a high degree of similarity between template and the image region exists. Further, if the template was augmented by OCR content, an OCR operation may also be performed on the image of the user-presented visual authentication element.

In Step 604, a score for the matching between the user-presented visual authentication element and the reference visual authentication element is computed. The degree of matching may be scored, for example, by counting pairs of matching visual features. In one embodiment of the invention, at least some of the visual features existing in one image do not exist in the other image. For example, the image of the user-presented visual authentication element may show a background, in addition to the user-presented visual authentication element, whereas the reference authentication element may only include visual features of the reference authentication element. In addition, some features may not be properly visible in the user-presented visual authentication element, for example due to poor lighting or because the user's hand or fingers cover aspects of the handheld, user-presented visual authentication element.

If template matching is used in Step 602, the matching score may describe the degree of similarity between the template and the image region where a high degree of similarity was found. Further, the matching score may additionally or alternatively be based on a match between the text content of the reference visual authentication element and the text content of the user-presented visual authentication element, extracted using the previously discussed OCR operations.

In Step 606, a validation of the user-presented visual authentication element is performed. The validation may be performed by making a determination about whether the matching score is above a matching threshold, thereby producing a validation result that quantifies the goodness of fit. The matching threshold, in accordance with an embodiment of the invention, specifies a minimum degree of matching required to accept the user-presented visual authentication element as identical to the reference visual authentication element. The threshold may be user specified or it may be set by the monitoring system, based on the analysis of the image of the reference visual authentication element in FIG. 3. For example, the matching threshold may be set to a percentage of the total number of detected features of the reference visual authentication element. If the threshold is reached or exceeded, the method may proceed to Step 608, where the user-presented visual authentication element is determined to be matching the reference visual authentication element. If the threshold is not reached, the method may proceed to Step 610, where the user-presented visual authentication element is determined to not match the reference visual authentication element. The above-discussed determination may be made deterministically or probabilistically.

Those skilled in the art will appreciate that above-described methods for authentication may be performed in addition to or as an alternative to other authentication methods. For example, a monitoring system in accordance with an embodiment of the invention may also allow a user to authenticate using geo-fencing, e.g. based on GPS coordinates of a user's portable device and/or based on wireless network signals (e.g. WiFi and/or Bluetooth signals) of the user's portable device, or using other methods including manually entered or spoken passcodes, etc., without departing from the invention.

In one embodiment of the invention, above described methods for visual authentication are used in a two-factor authentication. The two factor authentication may include the verification of the user's identity based on facial recognition (first factor), and of the visual authentication element (second factor). As previously discussed, the visual authentication element may be a physical object or an image. Alternatively, the visual authentication element used as the second factor in the two factor authentication may be a gesture, including combinations of eye blinks, facial expressions and/or hand or arm movements.

Further, above-described methods may also be used in conjunction with non-static visual authentication elements. A non-static visual authentication element may be, for example, a sequence of visual authentication elements that may or may not be require presentation in a particular order. For example, a visual authentication may require a user to present two particular ID cards, or the front and the back of a credit card. Further, the visual authentication element may be a gesture, performed by a hand, an arm, etc. If the gesture includes three-dimensional elements with a significant change in depth, the depth-sensing camera of the monitoring system may be used in addition to or as an alternative to the video camera, for capturing the gesture. Those skilled in the art will recognize that the algorithms may be adapted to specific requirements resulting from the use of a particular type of visual authentication element, without departing from the invention.

The use case scenario described below is intended to provide an example of the method and system for visual authentication. This use case scenario is intended to serve illustrative purposes only. The method and system for visual authentication is not limited to the scenario described below Fred owns a house equipped with a monitoring system in accordance with one or more embodiments of the invention. Fred decides that he would like to use his driver license to arm and disarm the monitoring system because he finds it difficult to memorize conventional passcodes. Fred therefore registers his driver license as a new visual authentication element (FIG. 3). As part of this registration, Fred presents his driver license to the video camera of the monitoring system, the monitoring system takes one or more pictures of the driver license, isolates the driver license from other background image content, and subsequently extracts visual features from the picture(s) of Fred's driver license. Fred, during the registration of his driver license as a visual authentication element, also specifies that presentation of the driver license to the armed monitoring system is intended to disarm the monitoring system.

Fred further decides that his daughter and his son should both also be able to disarm the monitoring system when they return home from school. Fred's daughter insists on using a small yellow rubber duck that is attached to her keychain as her visual authentication element, whereas his son wants to use a tattoo on his arm as his visual authentication element. Accordingly, Fred repeats the authentication procedures with the yellow rubber duck of his daughter and the tattoo of his son.

The monitoring system, as a result, stores the visual features of all three visual authentication elements. Fred, his daughter and his son, from now on always use their respective authentication elements to disarm the system whenever they return home, and find this very convenient. Disarming the system by Fred, his son and his daughter also disables all recording of the monitoring system.

Fred also occasionally requests a housekeeper to clean his house. Fred, in the evening schedules the housekeeper to do the cleaning the next day at 2 PM. He programs the monitoring system to provide access to the housekeeper using a temporary visual authentication element. The temporary visual authentication element is a randomly selected image, to be sent to the housekeeper. Fred specifies the housekeeper's phone number, thus enabling the monitoring system to send the visual authentication element to the housekeeper's smartphone via a Multimedia Messaging Service (MMS) message. The housekeeper receives a message that includes a confirmation of the 2 PM appointment, the visual authentication element (i.e., the randomly selected image), and detailed instructions for how to perform the authentication. The message also specifies that the visual authentication element will not be accepted before 2 PM, and further that the available time window for accessing the house, granted after successful authentication, is limited to one hour, after which the monitoring system automatically arms again.

The housekeeper follows the instructions, performs the authentication at 2:05 PM and completes all cleaning and leaves before 3:05 PM. While the housekeeper is on site, the system is disarmed, but nevertheless records the activities in the house.

Embodiments of the invention may enable visual authentication of persons using visual authentication elements. A visual authentication element may be a user-carried object. Any object may be chosen to serve as a visual authorization element, and the choice may not be obvious thus making it difficult for a malicious actor to guess the visual authorization element to be used. The use of visual authorization elements thus eliminates the need for memorization of complex access codes without compromising security. Alternatively, the visual authentication element may also be a temporarily valid (e.g. one-time-use) image that may be sent to a user's portable device. The administrator of the system may issue a visual authentication element in the form of an image at any time from any location and may send the image to a guest to be allowed in the monitored environment. The image may expire after a set amount of time or after a set number of uses and the authorization may include additional limitations that further limit the access to the monitored environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions that enable a monitoring system to:
pre-provision the monitoring system with a first reference visual authentication element and a second reference visual authentication element, the first reference visual authentication element comprises a visual feature and a text content element, wherein the first reference visual authentication element and the second reference visual authentication element are obtained from a user;

storing the first reference visual authentication element;

obtain, after the pre-provisioning and, from the user, an image of a first user-presented visual authentication element;

generate a first validation result by validating the first user-presented visual authentication element against the first reference visual authentication element, wherein the first validation result is a matching score that quantifies the goodness of fit obtained from performing matching on the first user-presented visual authentication element with the first reference visual authentication element; and based on the first validation result:

make a first determination that the first user-presented visual authentication element matches the first reference visual authentication element; and based on the first determination: disarm the monitoring system;

obtain, after the pre-provisioning and, from the user, an image of a second user-presented visual authentication element;

generate a second validation result by validating the second user-presented visual authentication element against the second reference visual authentication element; and based on the second validation result:

make a second determination that the second user-presented visual authentication element matches the second reference visual authentication element; and based on the second determination: trigger a silent alarm.

2. The non-transitory computer readable medium of claim 1, further comprising instructions to:

based on the second determination: disarm the monitoring system.

3. The non-transitory computer readable medium of claim 1, further comprising instructions to:

based on the second determination: keep a video recording function of the monitoring system enabled.

4. The non-transitory computer readable medium of claim 1, wherein obtaining the first reference visual authentication element comprises:

capturing an image of the first user-presented visual authentication element; and isolating, in the captured image of the first user-presented visual authentication element, the first user-presented visual authentication element, wherein the isolated first user-presented visual authentication element is the first reference visual authentication element.

5. The non-transitory computer readable medium of claim 1, wherein the first user-presented visual authentication element is an image displayed on a portable device.

6. The non-transitory computer readable medium of claim 5, wherein the image displayed on the portable device is sent to the portable device prior to performing the visual authentication.

7. The non-transitory computer readable medium of claim 6, wherein pre-provisioning the monitoring system with the first reference visual authentication element comprises selecting the image displayed on the portable device from a plurality of visual images.

8. A method for visual authentication with a monitoring system, comprising:

pre-provisioning the monitoring system with a first reference visual authentication element and a second reference visual authentication element, the first reference visual authentication element comprises a visual feature and a text content element, wherein the first reference visual authentication element and the second reference visual authentication element are obtained from a user;

storing the first reference visual authentication element;

obtaining, after the pre-provisioning and, from the user, an image of a first user-presented visual authentication element;

generating a first validation result by validating the first user-presented visual authentication element against the first reference visual authentication element, wherein the first validation result is a matching score that quantifies the goodness of fit obtained from performing matching on the first user-presented visual authentication element with the first reference visual authentication element; and based on the first validation result:

making a first determination that the first user-presented visual authentication element matches the first reference visual authentication element; and based on the first determination: disarming the monitoring system;

obtaining, after the pre-provisioning and, from the user, an image of a second user-presented visual authentication element;

generating a second validation result by validating the second user-presented visual authentication element against the second reference visual authentication element; and based on the second validation result:

making a second determination that the second user-presented visual authentication element matches the second reference visual authentication element; and based on the second determination: triggering a silent alarm.

9. The method of claim 8, further comprising:

based on the second determination: disarming the monitoring system.

10. The method of claim 8, further comprising:

based on the second determination: keeping a video recording function of the monitoring system enabled.

11. The method of claim 8, wherein obtaining the first reference visual authentication element comprises:

capturing an image of the first user-presented visual authentication element; and isolating, in the captured image of the first user-presented visual authentication element, the first user-presented visual authentication element, wherein the isolated first user-presented visual authentication element is the first reference visual authentication element.

12. The method of claim 8, wherein the first user-presented visual authentication element is an image displayed on a portable device.

13. The method of claim 12, wherein the image displayed on the portable device is sent to the portable device prior to performing the visual authentication.

14. The method of claim 13, wherein pre-provisioning the monitoring system with the first reference visual authentication element comprises selecting the image displayed on the portable device from a plurality of visual images.

* * * * *